Nov. 14, 1939.                J. E. BURKS                    2,180,194
                         PHOTOGRAPHIC APPARATUS
                         Filed July 23, 1937        5 Sheets-Sheet 1

INVENTOR
JOHN E. BURKS
BY Horridge and Dowd
ATTORNEYS

Nov. 14, 1939.   J. E. BURKS   2,180,194
PHOTOGRAPHIC APPARATUS
Filed July 23, 1937   5 Sheets-Sheet 2

INVENTOR
JOHN E. BURKS
BY
ATTORNEYS

Nov. 14, 1939.  J. E. BURKS  2,180,194
PHOTOGRAPHIC APPARATUS
Filed July 23, 1937  5 Sheets-Sheet 4

INVENTOR
JOHN E. BURKS
BY
Horridge and Dowell
ATTORNEYS

Patented Nov. 14, 1939

2,180,194

UNITED STATES PATENT OFFICE 2,180,194

PHOTOGRAPHIC APPARATUS

John E. Burks, Great Neck, N. Y., assignor to Max Fleischer, New York, N. Y.

Application July 23, 1937, Serial No. 155,170

11 Claims. (Cl. 88—24)

This invention relates to photographic apparatus and has for its principal object to provide a novel form of projection printer whereby the pictures contained in the several frames of a motion picture negative film of the usual type may be successively printed by projection upon a flat rectangular sensitized surface such, for example, as a single sheet of sensitized paper with the pictures disposed in oblique columns and in such way that when said sheet is bent into the form of a cylinder with the upper and lower edges of the sheet abutting each other, the sequence of pictures will be in the form of a continuous spiral such as is described in and forms part of the subject matter of a pending application filed by Max Fleischer and myself on April 5, 1937, Serial No. 134,988.

Another object of my invention is to provide such an apparatus in which the movable bed or platen carrying the sheet upon which the pictures are successively printed may be accurately and without jar moved into its successive positions in step with the intermittent movement of the motion picture negative film.

Still another object of my invention is to provide such an apparatus having means to compensate for the various degrees of shrinkage inherent in the different papers used for photographic prints so that the dimensions of the finished sheet of pictures will exactly fit the size drum upon which they are designed to be mounted and not leave any gap between the top row and bottom row of pictures in each of the several columns.

Other objects and advantages will appear from the following description of the invention taken in connection with the attached drawings in which.

Figure 14:
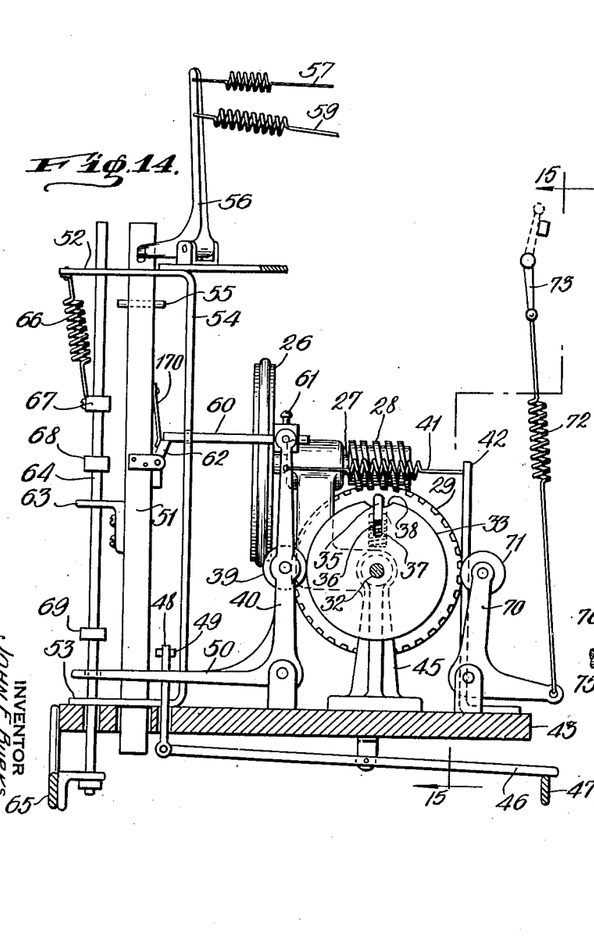
Fig. 14 is a detailed view of part of the operating mechanism of the projector portion of the apparatus.
Figures 15, 16:
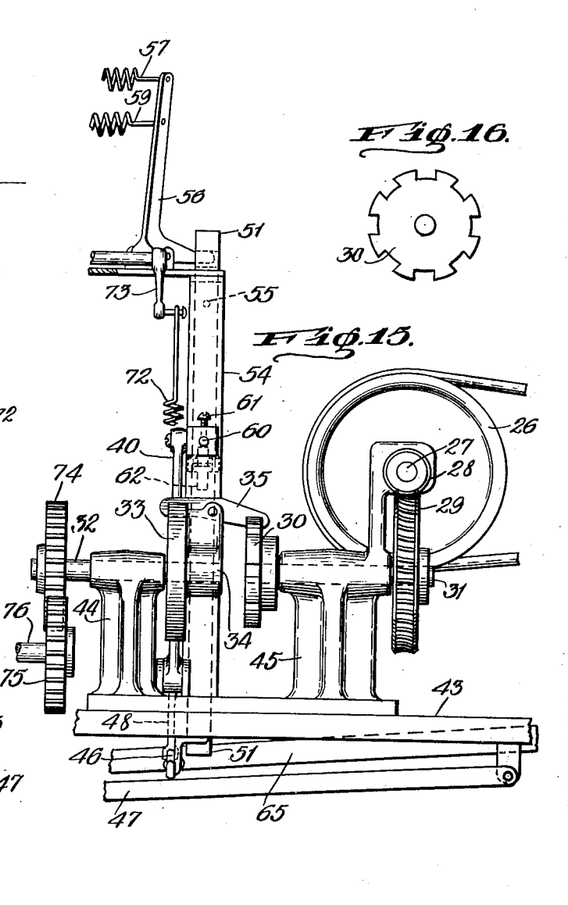
Fig. 15 is a view on the line 15—15 of Fig. 14.
Fig. 16 is a view of the star wheel whereby motive power is intermittently communicated to the apparatus.

Referring to the drawings, 1 is a stand of open skeleton construction made preferably of angle-iron which serves to support the several component parts of the apparatus hereinafter described. 2 is a horizontal carriage of an open truss construction preferably made of a strong light metal such as an aluminum alloy, slidably supported upon the stand 1. Also supported on said stand 1 directly above and normal to the upper surface of the carriage 2 is the projector portion of the apparatus consisting of a light proof lamphouse 3 containing an incandescent lamp 4 positioned beneath the spherical reflector 5, a sheet of ground glass 6 beneath which is adjustably mounted a condensor 7, a light tube 8 terminating at the bottom in a suitable housing 9 which contains a pivoted opaque safety shutter 10, a revolving exposure shutter 11, and a manually operated pivoted safety filter shutter 12, a connecting light tube 13 extending therefrom to a housing 14 through which the film 15 from which the print is to be made is intermittently advanced from the feed reel 16 to the take-up reel 17 beneath another condensor 18 and between two glass plates 19 and 20 with an aperture plate 21 thereunder conforming to the frame of the film, and a projection lens 22 in the lens mount 23 equipped with an iris diaphragm. 25 is an electric motor connected by a belt to a pulley 26 mounted on one end of the shaft 27 to the other end of which shaft is attached the worm 28 which drives the gear 29 and star wheel 30, both of which are attached to the opposite ends of the shaft 31. 32 is a shaft disposed in co-axial alignment with the shaft 31 and carrying on its end adjacent the star wheel 30 a wheel 33 formed with a hub 34 which supports the pivoted rocker arm 35, one end of which is adapted to engage in the notches of the star wheel 30 while the other end is positioned in a slot 36 in the periphery of the wheel 33 into which it may be forced a sufficient distance against the pressure of the coil spring 37 to lift the other end out of engagement with the star wheel 30. Said slot 36 near its outer end is in the form of an arcuate depression 38 in the periphery of the wheel 33 and is adapted to receive the roller 39 which is rotatably mounted on the vertical arm 40 of a bell crank and is held in close engagement with the periphery of the wheel 33 by means of the tension coil spring 41 attached to the rigid arm 42 mounted on the base 43, upon which are also mounted the bearings 44 and 45 for the shafts 32 and 31 respectively. Pivotally mounted on the underside of the base 43 is the lever 46, one end of which is adapted to be lifted by a pivoted lever 47 while the other end is pivotally connected to a rod 48 extending upwardly through an opening in the base 43 and provided at its upper end with a stop pin 49 adapted to engage with the horizontal arm 50 of the above said bell crank. 51 is a vertical bar of rectangular cross section slidably mounted in conforming openings in the horizontal portions 52 and 53 of the vertical standard 54 attached to the said base 43. Said bar near its upper end is provided with a pin 55 extending therethrough and adapted to limit the upward movement of said bar. Said bar at its upper end is operatively connected to the horizontal arm of the bell crank 56 the vertical arm of which is connected by means of the tension spring 57 and the link 58 to the pivoted opaque safety shutter 10 which is normally held in its closed position under the tension of the coil spring 59 and is opened by the downward movement of the bar 51, the intervening coil spring 57 permitting further downward movement of the bar 51 after the shutter 10 has reached its open position. Pivotally mounted on one side of the bar 51 and at a level suitable for cooperation with the horizontal pin 60 which is attached by the set screw 61 to the vertical bell crank arm 40 is a pawl 62 which is held in an outwardly extending position by the flat spring 170. Upon the side of said bar 51 opposite to that upon which is located the pawl 62 is a bracket 63 provided with an opening to receive the vertical rod 64 which is slidably mounted in openings in the upper and lower horizontal portions 52 and 53 of the standard 54 and extends through an opening in the base 43 where its lower end is operatively connected to the lever 65 whereby said rod 64 may be pulled downward against the tension of the cail spring 66 which is attached to the said upper horizontal portion 52 of the standard 54 and to the rod 64 by the screw fastened collar 67. A collar 68 rigidly attached to said rod 64 is adapted by engagement with the bracket 63 to depress said bar 51 while the collar 69 also rigidly attached to said rod is adapted to engage and depress the horizontal bell crank arm 50. 70 is another bell crank pivotally mounted on the base 43 and has journaled in its upper arm a roller 71 similar to the roller 39 which may be pressed into engagement with the periphery of the wheel 33 on the side opposite to that of the roller 39 by increasing the tension of the coil spring 72 attached to said bell crank 70 by moving the crank handle 73 to the position shown in dotted lines (Fig. 14).

Upon the other end of the shaft 32 is fixed a gear 74 meshing with the gear 75 attached to one end of the shaft 76 which terminates within the housing 14 and is there operatively connected to the feed sprockets 167 and 168, the take-up reel 17 and to a pull claw mechanism of the usual type adapted by engagement with the sprocket holes of the motion picture film to intermittently advance said film frame by frame past the aperture 21. Also mounted on said shaft 32 adjacent the gear 74 is the bevel gear 77 in mesh with a bevel gear 78 mounted on the lower end of the vertical shaft 79. The rotation of said shaft 79 through the chain of bevel gears 80, 81, 82 and 83 operates the rotating shutter 11 while an eccentric cam 84 attached to said shaft 79 serves to open and close an electrical circuit across the ends of the spring contacts 85 and 86. The upper end of the said shaft 79 is provided with a pair of bevel gears 87 and 88 to operate the counter 89 whereby a record may be kept of the number of frames of film successively printed by the apparatus.

The operation of the projector portion of the apparatus is as follows: With the electric motor 25 in operation, the lever 65 is for an instant depressed by hand pulling down the rod 64 whereby the collar 68 is brought into engagement with the bracket 63 causing the bar 51 to descend carrying the pawl 62 beneath the pin 60 and actuating the bell crank 56 which through the link 58 opens the opaque safety shutter 10. With the further downward movement of the rod 64 the collar 69 engages with and depresses the bell crank horizontal arm 50 causing the roller 39 to be withdrawn from the arcuate depression 38 in the periphery in the wheel 33 and allowing the rocker arm 35 to move outward under the pressure of the spring 37, thus causing the other end of said rocker arm to engage one of the notches of the rotating star wheel 30 whereby the wheel 33 is caused to rotate with the star wheel 30. At the same time the pin 60 has been pushed into engagement with the upper end of the pawl 62 thereby preventing any upward movement of the bar 51 and thus holding the opaque safety shutter 10 in its open position. The wheel 33 will continue to rotate to the extent of one complete revolution when the spring tensioned roller 39 again engages with the arcuate depression 38 in the periphery of the wheel 33 depressing the rocker arm 35 into the slot 36 and thereby disengaging it from the star wheel 30 whereby further rotation of the wheel 33 is stopped. At the same time the pin 60 is withdrawn from engagement with the pawl 62 permitting the bar 51 to spring upward under the tension of the coil spring 59 attached to the bell crank 56 and the opaque safety shutter 10 to close.

It is to be noted that the height of the collar 69 above the horizontal bell crank arm 50 is slightly greater than that of the collar 68 above the bracket 64 so that the opaque safety shutter 10 is opened in advance of the disengagement of the roller 39 from the arcuate depression 38 in the periphery of the wheel 33. Furthermore the ratio of the aforementioned cooperating gears and the design of the cam 84 and its position and the position of the shutter 11 on the shaft 79 are such that in the first one-half revolution of the wheel 33 starting from a position where the roller 39 is in engagement with the arcuate depression 38, the shutter 11 which is formed with a cut out sector of approximately 120° has been brought from a closed position to a wide open position in the light path, and during substantially the entire second one-half revolution of said wheel 33 the said shutter 11 is in a closed position, and as soon as said shutter has moved from an open to a closed position in the course of its rotation the cam 84 engages the spring contact 85 and closes momentarily an electric circuit across the ends of the spring contacts 85 and 86 while the pull claw mechanism connected to the shaft 76 operates to bring the next frame of the motion picture negative film 15 into register with the aperture in the plate 21.

The closing of said electrical circuit by the cam 84 operates that portion of the apparatus whereby the sheet of sensitive paper to receive the images projected from the film 15 is caused to be moved intermittently both longitudinally and laterally, in step with the movement of said film. Said portion of the apparatus is described with reference to the drawings as follows:

The supporting stand 1 adjacent its ends is provided with horizontal guide rails 90 and 91 disposed in a line at right angles to the direction of travel of the film 15 upon which rails is slidably supported the carriage 2 by means of the guide blocks 92, 93, 94 and 95 rigidly attached to said carriage and each formed with a depression conforming to the cross section of said rails. Also mounted on said stand and disposed parallel to the rails 90 and 91 are two toothed racks 96 and 97. 98 and 99 are two pinions mounted on opposite ends of the shaft 100 journaled on said carriage and meshing with the racks 96 and 97 so that by rotation of the shaft 100 the said carriage is moved along said rails 90 and 91. Mounted on the top side of said carriage and disposed parallel to each other and at an oblique angle to the line of travel of the film 15 are two horizontal guide rails 101 and 102 upon which is slidably mounted a platen 103, to support a sheet of sensitized paper held flat thereon by the glass plate 104. 105, 106, 107 and 108 are guide blocks attached to the underside of the platen and are formed with depressions conforming to the cross-section of the rails 101 and 102. Movement of the platen 103 along the rails 101 and 102 in the general direction of the travel of the film 15 but somewhat oblique thereto is accomplished by the tension of the flat coil spring 109 mounted on the carriage 2, one end of which spring is attached to the underside of the platen 103 as at 110, while movement in the opposite direction is accomplished manually thereby putting the spring 109 in tension. The intermittent movement of the platen 103 is controlled by a pair of pawls 111 and 112 coacting with successive of the cleats 113 attached to the underside of the platen, disposed substantially transversely of the direction of longitudinal movement of the platen 103 and equally spaced from each other along any line in said direction.

Figures 1, 13:
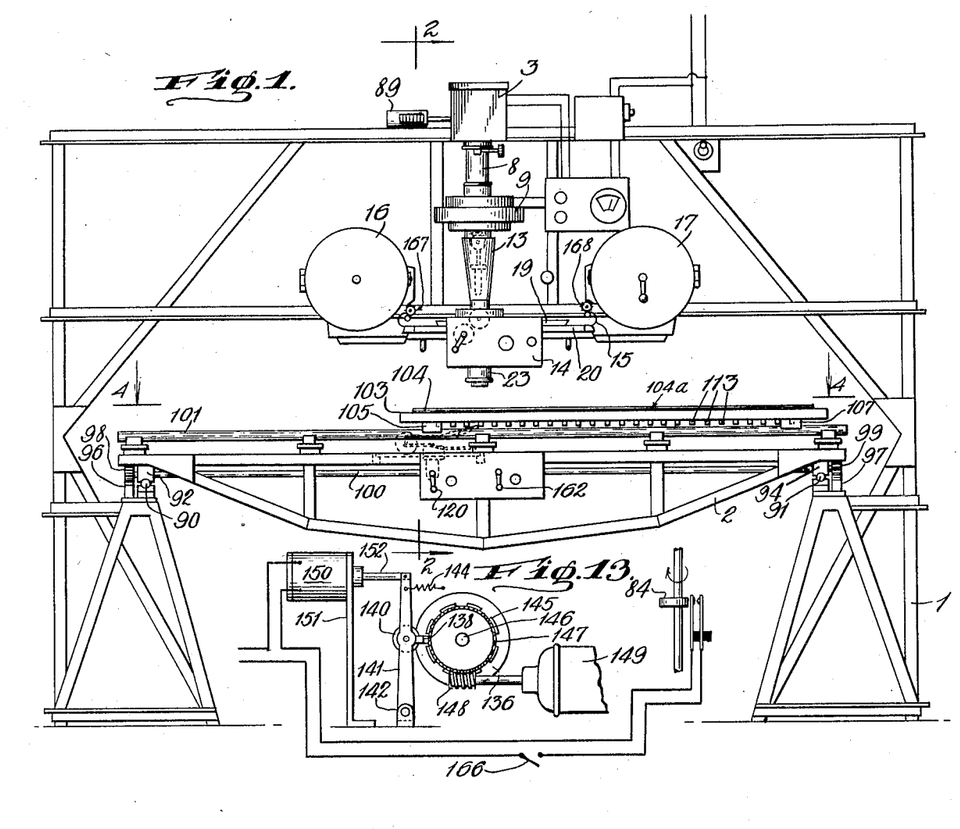
Fig. 1 is a front elevation of the apparatus.
Fig. 13 is a view on the line 13—13 of Fig. 8.
Figure 2:
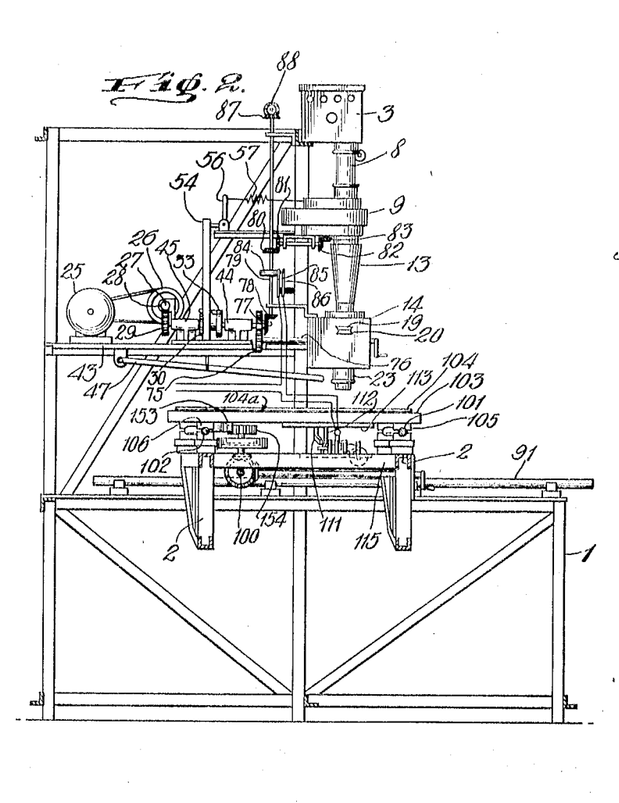
Fig. 2 is a cross-section on the line 2—2 of Fig. 1.
Figure 3:
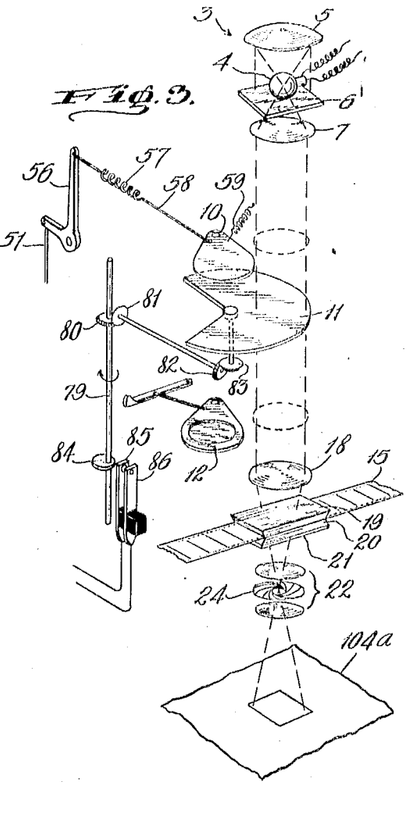
Fig. 3 is a diagrammatic view in perspective of the optical arrangement of the projector portion of the apparatus.
Figure 4:
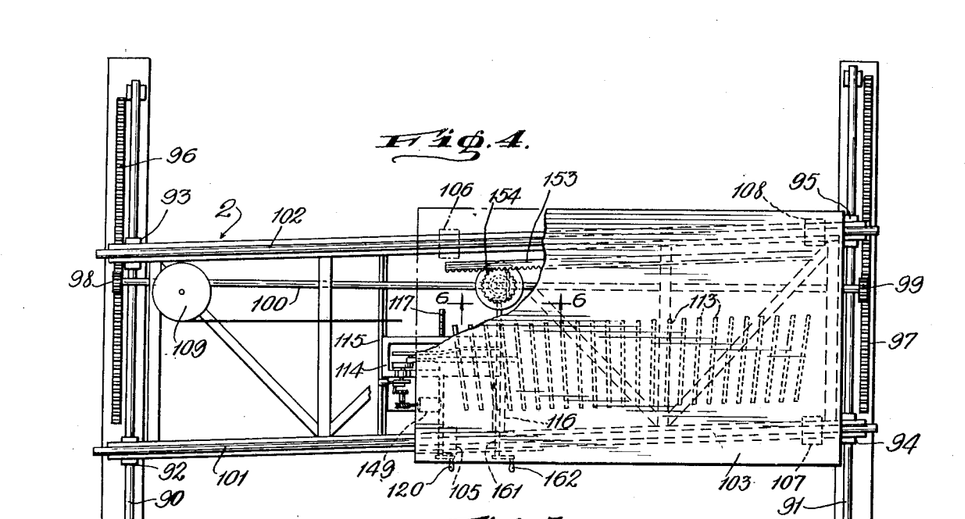
Fig. 4 is a plan view of the movable bed portion of the apparatus with part of the platen cut away.
Figure 5:
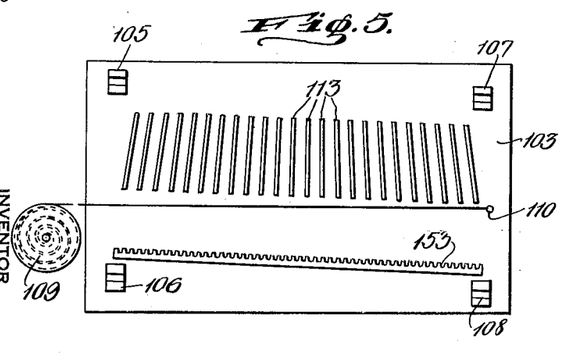
Fig. 5 is a view of the underside of the platen.
Figure 6:
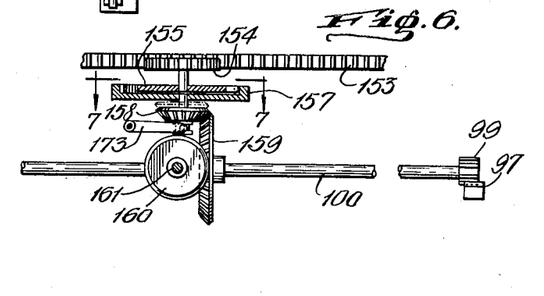
Fig. 6 is a view on the line 6—6 of Fig. 4.
Figure 7:
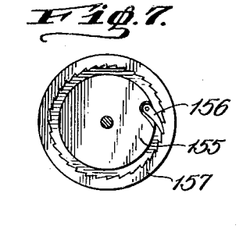
Fig. 7 is a view on the line 7—7 of Fig. 6.
Figures 8, 9, 10, 11, 12:
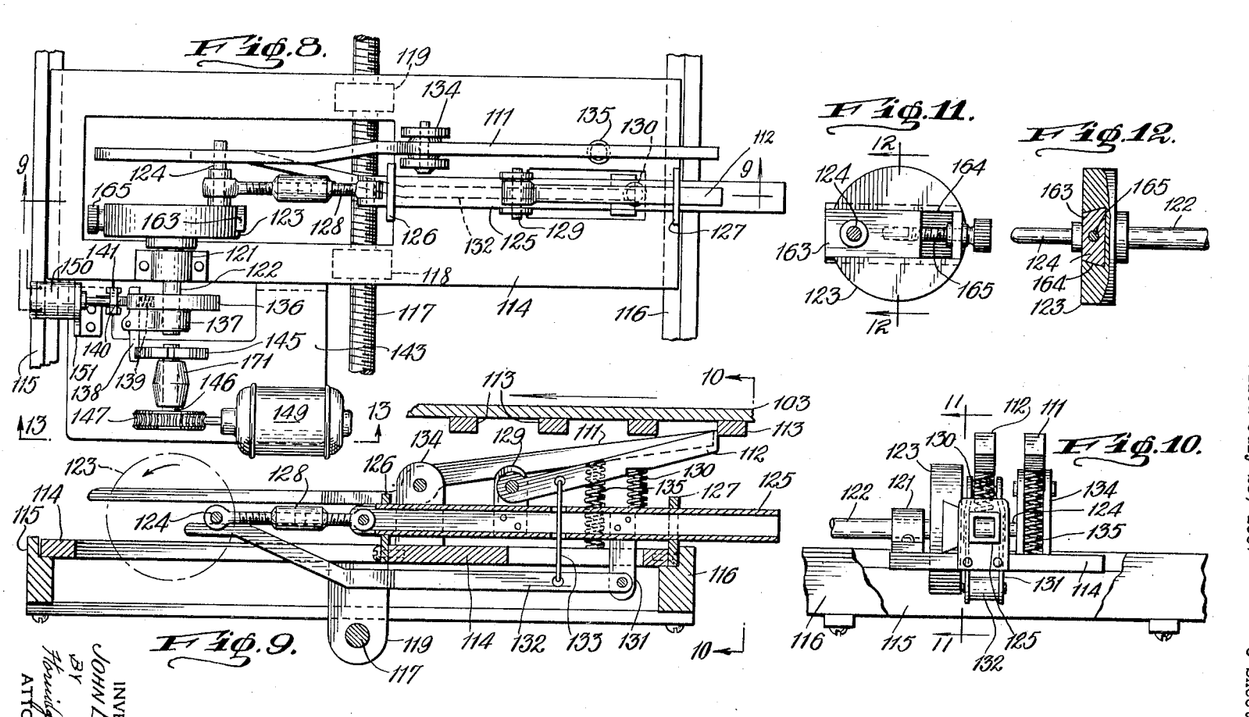
Fig. 8 is a detailed plan view of a portion of the mechanism for moving the platen.
Fig. 9 is a view on the line 9—9 of Fig. 8.
Fig. 10 is a view on the line 10—10 of Fig. 9.
Fig. 11 is a view on the line 11—11 of Fig. 10.
Fig. 12 is a view on the line 12—12 of Fig. 11.

114 is a base plate slidably mounted on the transverse guide rails 115 and 116 on the carriage 2 and movable transversely of said carriage by means of the threaded shaft 117 in conjunction with the internally threaded blocks 118 and 119 fixed on the underside of the plate 114. Said threaded shaft 117 is manually rotated by the crank handle 120. Journaled as at 121 on the plate 114 is the shaft 122 carrying on its inner end the wheel 123 which is provided on one side with the eccentric pin 124. 125 is a horizontal sliding member mounted in the upright guides 126 and 127 attached to the base plate 114 and operatively connected to the pin 124 by means of the connecting rod 128 which is adjustable as to length since it is constructed in the form of a turnbuckle. Thus as the wheel 123 revolves a reciprocating movement is imparted to the sliding member 125. The pawl 112 is pivotally attached at one end as at 129 to the upperside of the sliding member 125 and its other end is normally held in engagement with one of the cleats 113 on the underside of the platen 103 by the compression spring 130 mounted on the sliding member 125. Pivoted at one end to a downwardly extending bracket 131 attached to the sliding member 125 is a lever 132 the other end of which is adapted to engage with and be depressed by the pin 124 during the lower half of each revolution of the wheel 123. Said lever 132 is connected to the pawl 112 by the link 133.

The pawl 111 which is in the form of a lever is pivotally mounted substantially midway of its length on the upright bracket 134 attached to the base plate 114. One end of said pawl is normally held in engagement with one of the cleats 113 on the underside of the platen 103 by the compression spring 135 while the other end is adapted to engage with and be lifted by the pin 124 during the upper half of each revolution of the wheel 123.

Mounted on the outer end of the shaft 122 is the wheel 136 similar in design to the wheel 33 having a hub 137 in which is pivoted a rocker arm 138 one end of which is adapted to be pressed into a slot in the periphery of the said wheel 136 against the compression of the coil spring 139 by the roller 140 journaled in the upright arm 141 pivotally mounted as at 142 on a lateral extension 143 of the base plate 114. Said roller 140 is normally held seated in an arcuate depression in the periphery of said wheel 136 at the orifice of said slot by the tension spring 144, whereby the other end of said rocker arm 138 is held out of engagement with the star wheel 145. Said star wheel 145 is mounted on one end of the shaft 146 and is disposed adjacent and in axial alignment with the wheel 136. On the other end of said shaft is mounted a gear 147 in mesh with and driven by the worm 148 on the shaft of the electric motor 149. 150 is a solenoid supported by the bracket 151 on the baseplate extension 143 which also supports the bearing 171 for the shaft 146 and the electric motor 149. The armature of said solenoid 150 is attached by a link 152 to the upper end of the upright arm 141, so that when said solenoid is energized by the rotating cam 84 closing the solenoid circuit across the switch points 85 and 86, the roller 140 is withdrawn from engagement with the arcuate depression in the periphery of the wheel 136 thus permitting the adjacent end of the rocker arm 138 to emerge from the slot and the other end of said rocker arm to engage with the star wheel 145 whereby the power from the electric motor, which is normally in continual operation, is transmitted to the wheel 123.

As shown in Figs. 8 and 9, the above described mechanism for the transverse movement of the platen 103 is shown in the position reached shortly after the shutter 11 has closed and where the cam 84 in the further rotation has already closed for an instant the solenoid circuit releasing the rocker arm 138, with the result that the wheel 123 has begun to rotate and will continue to rotate for the space of one revolution until the roller 140 again engages the said arcuate depression and forces the adjacent end of the rocker arm 138 into the slot. Starting from the position of the pin somewhat below the dead center position as shown in Figs. 8 and 9 and with the wheel 123 rotating in a counter clockwise direction it will be noted that as the pin moves up to the horizontal level of the shaft 122 the sliding member 125 carrying with it the platen 103 will be pushed by the pawl 112 a slight extent, say a thirty-second of an inch, just sufficient to cause the cleat 113 pressing against the pawl 111 to be separated therefrom, while further rotation of said wheel will cause the pin 124 to bear upwards against the adjacent portion of the pawl 111 thereby depressing the other end and permitting it to pass under the said cleat while the platen moves backwards, under the tension of the coil spring 109, with the receding sliding member 125. During the second quarter revolution of the wheel 123, the downward movement of said pin 124 will permit the pawl 111 to rise so that at the end of backward travel of the sliding member 125 the pawl 111 will engage the next succeeding cleat 113 preventing further movement of the platen 103. During the third quarter revolution of said wheel the lever arm 132 will be depressed by the pin 124 thus depressing the pawl 112 and permitting it to pass on the underside of the cleat 113 with which it was in engagement and move upward and forward against the next succeeding cleat already in engagement with the pawl 111, so that when the wheel 123 comes to a stop with the pin 124 somewhat below the dead center position shown in Figs. 8 and 9, the platen 103 will be held at rest by the pawl 111 with the pawl 112 just a trifle short of being in contact with the said cleat during the period of further rotation of the shaft 79 when the shutter 11 in the course of its rotation allows the light to project the image of a frame of the negative film 15 upon the portion of the sensitized sheet 104a occupying the field of the lens. With each revolution, therefore, of the wheel 123 the platen will be moved a predetermined distance equal to the spacing of the cleats 113 along the line of engagement with said pawls. Such spacing is governed by the height of the printed pictures so that the successive pictures projected from successive frames of the negative motion picture film 15 will form an oblique column, each picture in the column being offset from the preceding picture a distance depending upon the degree of obliquity of the rails 101 and 102 with respect to the line of travel of the film 15. This degree of obliquity is equal to the width of the column, as measured along the top of a picture, for the vertical length of the column.

When one column of pictures has been printed the platen is moved manually back along the rails 101 and 102 to its starting position thereby again putting the spring 109 under tension. The inclination of the pawls 111 and 112 readily permits such movement. At the same time the platen 103 together with its supporting carriage 2 is moved laterally a distance equal to the width of the column so that the succeeding pictures will be printed in a similar way in a parallel column. Such lateral movement is accomplished by means of the rack 153 attached to the underside of the platen 103 which rotates the gear 154 and the disc 155 which carries on its face adjacent its periphery the pawl 156 adapted to engage with and rotate in one direction the internal ratchet wheel 157 and the bevel gear 158 which is slidably mounted on the same shaft with the ratchet wheel 157 and by means of the arm 173 may be placed in or out of mesh with the bevel gear 159 attached to the shaft 100. It will thus be seen that with the intermittent movement of the platen 103 in the general direction of the travel of the film 15 no lateral movement of the carriage 2 takes place since the pawl 156 merely rides over the teeth of the internal ratchet wheel 157 and imparts no motion thereto. The size and ratio of the several gears comprising the column spacing mechanism is such that the same desired extent of lateral movement of the carriage 2 takes place each time the platen is returned to its starting position. Such lateral movement of the carriage 2 may be accomplished manually, if preferred at any time, by unmeshing the gears 158 and 159 and driving the gear 159 by the bevel gear 160 on the shaft 161 by means of the hand crank 162.

To allow for the various degrees of shrinkage resulting from development and other processing of the various photographic papers that may be used for the sensitized sheet 140a so that a finished picture sheet of an exact definite size may be assured, means are provided in the printing operation for allowing for such different degrees of prospective shrinkage. It will be noted that the equally spaced cleats 113, the spacing of which controls the height of each printed picture in the columns, are not arranged in parallel but are spaced further apart at one end than at the other. This variation in their spacing need only be sufficient to accommodate papers ranging from those having the greatest amount of shrinkage to those having the least amount of shrinkage, and since the base plate 114 carrying the escapement pawls 111 and 112 is adjustable laterally of the platen 103 and the point of engagement of the pawls 111 and 112 with the cleats 113 may be located at any place along the length of said cleats by means of the threaded shaft 117, the longitudinal space on the sensitized paper 104 used for the printing of each of the successive projected images from the film 15 may be varied to any extent between these two extremes. This variation in the extent of the spacing between the cleats 113 along their length will require that the radius of eccentricity of the crank pin 124 be adjusted in accordance with the said spacing at the particular location of the pawls 111 and 112 so that said radius will be at all times a trifle more than one-half the distance on centers between said cleats at such location. This slight excess is for the purpose of enabling the pawl 112 to push the cleat out of contact with pawl 111 at the beginning of the cycle of rotation of the wheel 123 and permit the next succeeding cleat to come into contact with the pawl 111 at the end of backward travel of the sliding member 125. To provide means for such adjustment the pin 124 is mounted on a separate plate 163 slidably mounted in a groove 164 in the side of the wheel 123 and adjustable radially of said wheel by means of the feed screw 165 rotatably fixed in the periphery of said wheel and fitting in a threaded bore in the end of the plate 163. When the radius of the pin 124 is thus lengthened or shortened it will generally be necessary to shorten or lengthen the connecting rod 128 so that the cleat 113 will bear against the pawl 111 and be just out of engagement with the pawl 112 when the platen 103 is at rest. This is readily accomplished since the said connecting rod 128 is constructed in the form of a turnbuckle.

The sensitized paper will shrink at the same ratio in all directions and the above described means for making due allowance for such shrinkage by altering the longitudinal space for each picture and thus the lineal dimension of each column of pictures, will at the same time provide for lateral or cross column shrinkage of the paper. Since the degree of obliquity of the rails 101 and 102 is constant a greater or less extent of travel of the platen 103 in returning it at the end of each column of printed pictures to the starting position will cause a proportionately greater or less length of the rack 153 to act upon the gear 154 and thereby move the platen a correspondingly greater or less distance transversely of the lines of travel of the film 15 thus allowing for the greater or less width of the pictures in said columns.

If in the operation of the apparatus it is desired to advance the film 15 one frame without making an exposure the lever 46 is lifted by means of the pivoted lever 47 thereby causing the pin 49 to depress the horizontal bell crank arm 50 whereby the roller 39 is withdrawn from engagement with the arcuate depression in the periphery of the wheel 33 and allows the said wheel to rotate for the extent of one revolution but since the vertical bar 51 is not moved downward by this operation the opaque safety shutter 10 remains closed and no light passes through the optical system to the sensitized paper 104a on the platen 103, and if it is desired at the same time that the platen 103 should remain stationary the switch 166 in the solenoid circuit is opened thus permitting no actuation of the platen moving mechanism.

Where it is desired to stop the apparatus at a point where with the shutter 11 in an open position the image on one frame of the film 15 is projected on a sheet of paper on the platen 103 for the purpose, for instance, of focusing or framing the projected image, the crank 73 is turned to the position shown in the dotted lines in Fig. 14 thereby bringing the roller 71 into engagement with the periphery of the wheel 33 so that in the course of substantially a one-half revolution of the wheel 33 the arcuate depression 38 comes opposite the roller 71, the rocker arm 35 will be pressed into the slot 36 thus disengaging it from the star wheel 30 and stopping the shutter 11 in its open position. In this case the manually operated safety filter shutter 12 is closed to prevent exposure of the sensitized paper 104.

It is to be understood that my invention is in no wise restricted to the embodiments illustrated or referred to but that modifications may be made without departing from the spirit or sacrificing any of the advantages of the invention as defined in the appended claims.

What I claim is:

1. A projection printer of the class described which includes a projector adapted for the intermittent projection of successive frames of a motion picture film upon a sheet of sensitized material, a flat support for said sheet movable in the focal plane of the lens of said projector, means controlled by the operation of the projector for intermittently moving said support a predetermined distance in one direction in a straight line oblique to the line of travel of the film in the projector and in step with the intermittent advancement of said film, and means actuated by the movement of said support in the opposite direction to move said support a predetermined distance transversely of the line of travel of said film.

2. A projection printer of the class described which includes a projector adapted for the intermittent projection of successive frames of a motion picture film upon a sheet of sensitized material, a flat support for said sheet movable in the focal plane of the lens of said projector and means controlled by the operation of the projector for intermittently moving said support a predetermined distance in a straight line oblique to the line of travel of the film in the projector and in step with the intermittent advancement of said film, said means including tension means connected to said support, a series of cleats attached to said support and disposed substantially transversely of the line of travel of the film, a sliding pawl adapted to engage each of said cleats in succession and to move therewith and a stationary pawl adapted to engage each of said cleats in succession and hold said support at rest.

3. A projection printer of the class described which includes a projector adapted for the intermittent projection of successive frames of a motion picture film upon a sheet of sensitized material, a flat support for said sheet movable in the focal plane of the lens of said projector and means controlled by the operation of the projector for intermittently moving said support a predetermined distance in a direction oblique to the line of travel of the film in the projector and in step with the intermittent advancement of said film, said means including tension means connected to said support, a series of cleats attached to said support and disposed substantially transversely of the line of travel of the film and slightly oblique to each other, a sliding pawl adapted to engage each of said cleats in succession and to move therewith and a stationery pawl adjacent said sliding pawl and adapted to engage each of said cleats in succession and hold said support at rest, said pawls being adjustable longitudinally of said cleats.

4. A projection printer of the class described which includes a projector adapted for the intermittent projection of successive frames of a motion picture film upon a sheet of sensitized material, a flat support for said sheet movable in the focal plane of the lens of said projector, means controlled by the operation of the projector for intermittently moving said support a predetermined distance in one direction oblique to the line of travel of the film in the projector and in step with the intermittent advancement of said film, said means including tension means connected to said support, a series of cleats attached to said support and disposed substantially transversely of the line of travel of the film and slightly oblique to each other, a sliding pawl adapted to engage each of said cleats in succession and to move therewith and a stationery pawl adjacent said sliding pawl and adapted to engage each of said cleats in succession and hold said support at rest, said pawls being adjustable longitudinally of said cleats, and means actuated by the movement of said support in the opposite direction to move said support and said pawls transversely of the line of travel of said film.

5. A projection printer of the class described which includes a projector adapted for the intermittent projection of successive frames of a motion picture film upon a sheet of sensitized material, a flat support for said sheet movable in the focal plane of the lens of said projector, means controlled by the operation of the projector for intermittently moving said support a predetermined distance in a direction oblique to the line of travel of the film in the projector and in step with the intermittent advancement of said film, said means being adjustable to vary the distance which said support is so intermittently moved, and means actuated by the movement of said support in the opposite direction to move said support transversely of the line of travel of said film.

6. A projection printer of the class described which includes a projector adapted for the intermittent projection of successive frames of a motion picture film upon a sheet of sensitized material, a flat support for said sheet movable in the focal plane of the lens of said projector and means controlled by the operation of the projector for intermittently moving said support a predetermined distance in a direction oblique to the line of travel of the film in the projector and in step with the intermittent advancement of said film, said means including tension means connected to said support, a series of cleats attached to said support and disposed substantially transversely of the line of travel of the film with the spaces between said cleats varying equally along the length of said cleats, a sliding pawl adapted to engage each of said cleats in succession and to move therewith and a stationary pawl adapted to engage each of said cleats in succession and hold said support at rest, said pawls being movable transversely of the line of travel of the film.

7. A projection printer of the class described which includes a projector adapted for the intermittent projection of successive frames of a motion picture film upon a sheet of sensitized material, a flat support for said sheet movable in the focal plane of the lens of said projector and means controlled by the operation of the projector for intermittently moving said support a predetermined distance in a direction oblique to the line of travel of the film in the projector and in step with the intermittent advancement of said film, said means including a series of cleats attached to said support and disposed substantially transversely of the line of travel of the film with the spaces between said cleats varying equally along the length of said cleats.

8. A projection printer of the class described which includes a projector adapted for the intermittent projection of successive frames of a motion picture film upon a sheet of sensitized material, a flat support for said sheet movable in the focal plane of the lens of said projector, means controlled by the operation of the projector for intermittently moving said support a predetermined distance in a direction oblique to the line of travel of the film in the projector and in step with the intermittent advancement of said film, said means including a series of cleats attached to said support and disposed substantially transversely of the line of travel of the film with the spaces between said cleats varying equally along the length of said cleats, and means actuated by the movement of said support in the opposite direction to move said support transversely of the line of travel of said film.

9. A projection printer of the class described which includes a projector adapted for the intermittent projection of successive frames of a motion picture film upon a sheet of sensitized material, a flat support for said sheet movable in the focal plane of the lens of said projector and means controlled by the operation of the projector for intermittently moving said support a predetermined distance in a direction oblique to the line of travel of the film in the projector and in step with the intermittent advancement of said film, said means including a series of cleats attached to said support and disposed substantially transversely of the line of travel of the film with the spaces between said cleats varying equally along the length of said cleats and a coacting pawl adjustably positioned to engage said cleats at different points along their respective lengths.

10. In a projection printer of the class described, a projector adapted for the intermittent projection of successive frames of a motion picture film upon a sheet of sensitized material, a flat support for said sheet positioned in the focal plane of the lens of said projector and slidably mounted on rails disposed obliquely to the line of travel of the film, means for intermittently moving said support a predetermined distance in one direction in step with the intermittent advancement of said film and means actuated by the movement of said support in the opposite direction to shift said support a predetermined distance laterally of the line of travel of said film.

11. In a projection printer of the class described, a projector adapted for the intermittent projection of successive frames of a motion picture film upon a sheet of sensitized material, a flat support for said sheet positioned in the focal plane of the lens of said projector and slidably mounted on rails disposed obliquely to the line of travel of the film, means for intermittently moving said support a predetermined distance in one direction in step with the intermittent advancement of said film and means actuated by the movement of said support in the opposite direction to shift said support a predetermined distance laterally of the line of travel of said film, said shifting means including a pawl operated ratchet operatively connected to a pinion engaging a stationary rack.

JOHN E. BURKS.